United States Patent
Germscheid

(10) Patent No.: US 11,992,005 B2
(45) Date of Patent: May 28, 2024

(54) AUTOMATED SPRAY NOZZLE TEST SYSTEM

(71) Applicant: Micro-Trak Systems, Inc., Eagle Lake, MN (US)

(72) Inventor: Jeff Germscheid, Eagle Lake, MN (US)

(73) Assignee: Micro-Trak Systems, Inc., Eagle Lake, MN (US)

( * ) Notice: Subject to any disclaimer, the term of this patent is extended or adjusted under 35 U.S.C. 154(b) by 111 days.

(21) Appl. No.: 17/004,381

(22) Filed: Aug. 27, 2020

(65) Prior Publication Data

US 2021/0059235 A1 Mar. 4, 2021

Related U.S. Application Data

(60) Provisional application No. 62/893,973, filed on Aug. 30, 2019.

(51) Int. Cl.
*A01M 7/00* (2006.01)
*A01C 23/00* (2006.01)
(Continued)

(52) U.S. Cl.
CPC ......... *A01M 7/0096* (2013.01); *A01C 23/007* (2013.01); *A01C 23/047* (2013.01);
(Continued)

(58) Field of Classification Search
CPC . A01M 7/0096; A01M 7/0042; A01C 23/007; A01C 23/047; B05B 1/16; B05B 12/008
See application file for complete search history.

(56) References Cited

U.S. PATENT DOCUMENTS 4,357,670 A * 11/1982 McFarlane ............ B05B 12/008
  73/195
4,637,547 A * 1/1987 Hiniker .................. B05B 12/00
  239/69
(Continued)

FOREIGN PATENT DOCUMENTS

JP 2017-94274 A 6/2017

OTHER PUBLICATIONS

International Search Report and Written Opinion for Application No. PCT/US2020/048232 dated Dec. 8, 2020.

*Primary Examiner* — Steven M Cernoch
(74) *Attorney, Agent, or Firm* — Merchant & Gould P.C.

(57) ABSTRACT

A spray system and method for testing the flow rate of individual nozzles in the spray system are disclosed. The spray system can include a spray tank for holding a fluid to be sprayed, a pump in fluid communication with the spray tank, a manifold in fluid communication with the pump, a plurality of spray nozzles in fluid communication with the manifold, a main flow meter located in a first branch line in fluid communication with the pump and the manifold, a nozzle check flow meter located in a second branch line in fluid communication with the pump and the manifold, and a valve assembly for operating the spray system between a normal operation mode and a nozzle test mode, wherein in the normal operation mode, the valve assembly directs flow to the main flow meter, wherein in the nozzle test mode, the valve assembly directs flow to the nozzle check flow meter.

15 Claims, 4 Drawing Sheets

(51) Int. Cl.
  *A01C 23/04* (2006.01)
  *B05B 1/16* (2006.01)
  *B05B 12/00* (2018.01)

(52) U.S. Cl.
  CPC ............. *A01M 7/0042* (2013.01); *B05B 1/16* (2013.01); *B05B 12/008* (2013.01)

(56) References Cited

U.S. PATENT DOCUMENTS

| | | |
|---|---|---|
| 4,932,232 A | 6/1990 | Ballyns et al. |
| 5,478,013 A * | 12/1995 | Ballu ................. A01M 7/0089 239/71 |
| 5,967,066 A | 10/1999 | Giles et al. |
| 6,409,375 B1 * | 6/2002 | Knight ................. A01M 7/0092 366/136 |
| 7,311,004 B2 | 12/2007 | Giles |
| 8,833,680 B2 | 9/2014 | Ellingson et al. |
| 2013/0037625 A1 | 2/2013 | Arenson et al. |
| 2014/0263708 A1 | 9/2014 | Thompson et al. |
| 2014/0277780 A1 * | 9/2014 | Jensen ................. B05B 12/006 700/283 |
| 2015/0351375 A1 | 12/2015 | Ni |
| 2017/0072420 A1 * | 3/2017 | Meyer ................. A01M 7/005 |
| 2017/0080444 A1 | 3/2017 | Posselius et al. |
| 2017/0348718 A1 | 12/2017 | Preheim et al. |

\* cited by examiner

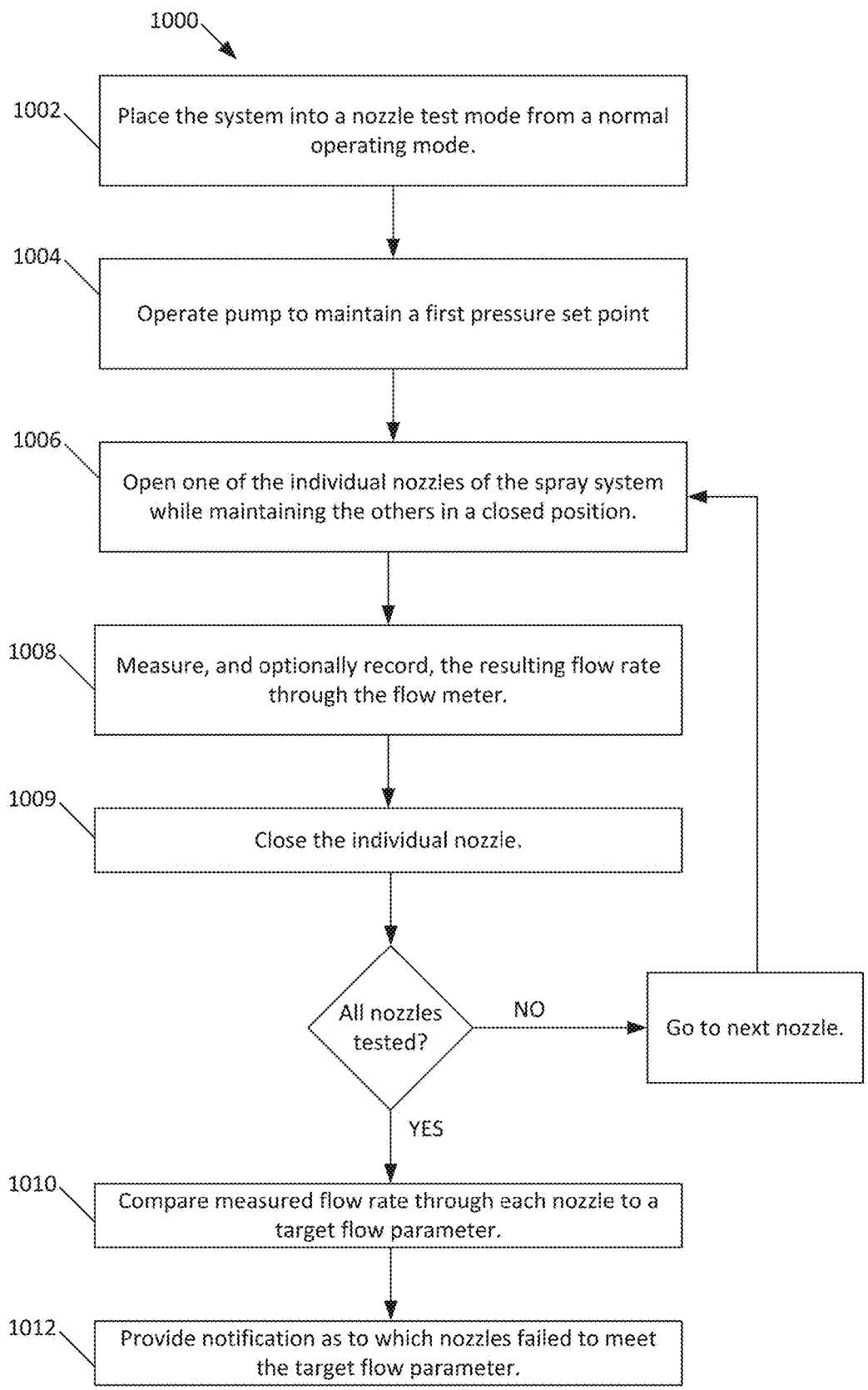

AUTOMATED SPRAY NOZZLE TEST SYSTEM

RELATED APPLICATION

This application claims the benefit of U.S. Provisional Application No. 62/893,973, filed Aug. 30, 2019, and titled "Automated Spray Nozzle Test System," the disclosure of which is hereby incorporated herein by reference.

BACKGROUND

Spraying systems exist for applying a material onto the ground or a field including crops or other vegetation. Many spraying systems include a number of individually controllable spray nozzles. To ensure proper operation and application of the material, it is desirable for each of the nozzles to spray the material within an acceptable flow range. In some testing methods, the operator must exit the vehicle associated with the spraying system in order to test the nozzles. In some testing methods, results can be unreliable due to the low flow of an individual nozzle in comparison to the total system flow. Improvements are desired.

SUMMARY

A spray system is disclosed. The spray system can include a spray tank for holding a fluid to be sprayed, a pump in fluid communication with the spray tank, a manifold in fluid communication with the pump, a plurality of spray nozzles in fluid communication with the manifold, a main flow meter located in a first branch line in fluid communication with the pump and the manifold, a nozzle check flow meter located in a second branch line in fluid communication with the pump and the manifold, and a valve assembly for operating the spray system between a normal operation mode and a nozzle test mode, wherein in the normal operation mode, the valve assembly directs flow to the main flow meter, wherein in the nozzle test mode, the valve assembly directs flow to the nozzle check flow meter.

In some examples, the nozzle check flow meter has a nominal volumetric flow testing range between 0 and 1 gallon per minute and wherein the main flow meter has a nominal volumetric flow testing range that is greater than 10 gallons per minute.

In some examples, the valve assembly is a three-way valve.

In some examples, the spray system further includes a pressure sensor arranged to sense fluid pressure in the manifold, wherein the pump is controlled to maintain a pressure set point at the pressure sensor when the spray system is in the nozzle test mode.

In some examples, the first and second branch lines connect to the manifold at separate locations.

In some examples, the first and second branch lines are arranged to place the main flow meter and the nozzle check flow meter in a parallel flow arrangement.

A method of testing individual nozzles on a spray system including a plurality of nozzles in fluid communication with a fluid pump is also disclosed. The method can include the steps of configuring the spray system from a normal operating mode into a nozzle test mode, wherein the normal operating mode includes directing flow from the pump through a main flow meter and the nozzle test mode includes directing flow from the pump to a nozzle check flow meter, operating the pump to meet a first pressure set point, opening one of the individual nozzles of the spray system while maintaining the remaining nozzles in a closed position, measuring the resulting flow rate through the nozzle check flow meter, closing the individual nozzle, repeating the testing for each individual nozzle until the flow rate through each individual nozzle has been measured at the nozzle check flow meter.

In some examples, the method includes recording each of the measured flow rates through the individual nozzles.

In some examples, the method includes comparing the measured flow rates through each individual nozzle to a target flow parameter.

In some examples, the method includes providing an indication of which individual nozzles fail to meet the target flow parameter.

In some examples, the target flow parameter is a flow rate range.

In some examples, the target flow parameter is a minimum flow rate.

In some examples, the method includes purging the spray system of air prior to configuring the system to operate in the nozzle test mode.

In some examples, the configuring step includes operating a three-way valve to direct flow from the pump to the nozzle check flow meter.

In some examples, the step of opening one of the individual nozzles includes opening one of the individual nozzles for a predetermined time period before closing the individual nozzle.

In some examples, the comparing step is performed as each individual nozzle is being tested.

In some examples, the method includes configuring the spray system from the nozzle test mode to the normal operating mode once all individual nozzles have been tested.

In some examples, the step of providing an indication includes providing a notification at a user interface located within the cab of a vehicle.

In some examples, the configuring step is initiated from a user interface located within the cab of a vehicle.

In some examples, the step of providing a notification includes reporting the measured flow rates of at least the individual nozzles failing to meet the target flow parameter.

A variety of additional aspects will be set forth in the description that follows. The aspects can relate to individual features and to combinations of features. It is to be understood that both the forgoing general description and the following detailed description are exemplary and explanatory only and are not restrictive of the broad inventive concepts upon which the examples disclosed herein are based.

BRIEF DESCRIPTION OF THE DRAWINGS

The accompanying drawings, which are incorporated in and constitute a part of the description, illustrate several aspects of the present disclosure. A brief description of the drawings is as follows:

FIG. 5 is a process flow chart showing a nozzle testing method.

DETAILED DESCRIPTION

Figure 1:
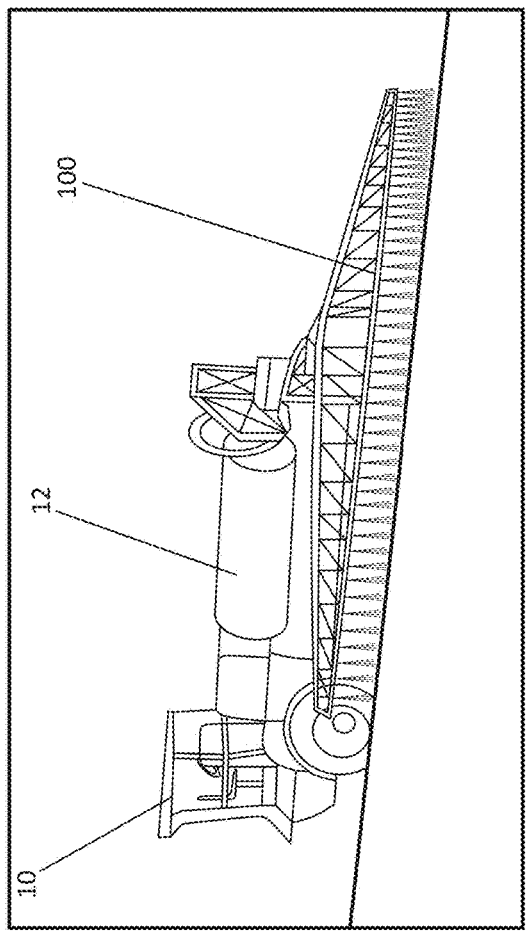
FIG. 1 is a schematic perspective view of a spraying system having features in accordance with the present disclosure, wherein the spraying system is mounted to a vehicle.

Various examples will be described in detail with reference to the drawings, wherein like reference numerals represent like parts and assemblies throughout the several views. Reference to various examples does not limit the scope of the claims attached hereto. Additionally, any examples set forth in this specification are not intended to be limiting and merely set forth some of the many possible examples for the appended claims. Referring to the drawings wherein like reference numbers correspond to like or similar components throughout the several figures.

General System Construction

Figure 2:
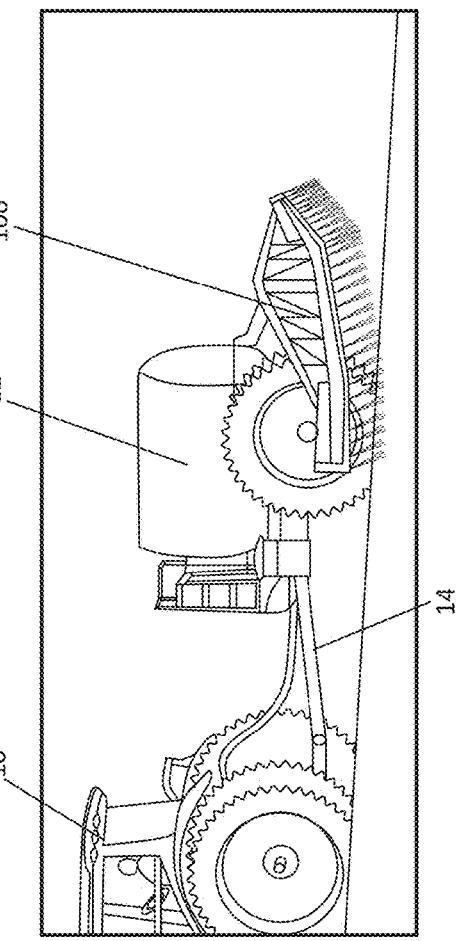
FIG. 2 is a schematic perspective view of a spraying system having features in accordance with the present disclosure, wherein the spraying system is mounted to a trailer towed by a vehicle.

Referring to FIGS. 1 and 2, a spraying system 100 in accordance with the present disclosure is shown. The spraying system 100 is configured for spraying a liquid material onto the ground or a field including crops or other vegetation. In FIG. 1, the spraying system 100 is shown as being mounted to the rear of a vehicle 10 supporting one or more tanks 12 in fluid communication with the spraying system 100. In FIG. 2, the spraying system 100 is shown as being mounted to the rear of a trailer 14 supporting one or more tanks 12, wherein the trailer 14 is towed by a vehicle 10, such as a tractor.

Figure 3:
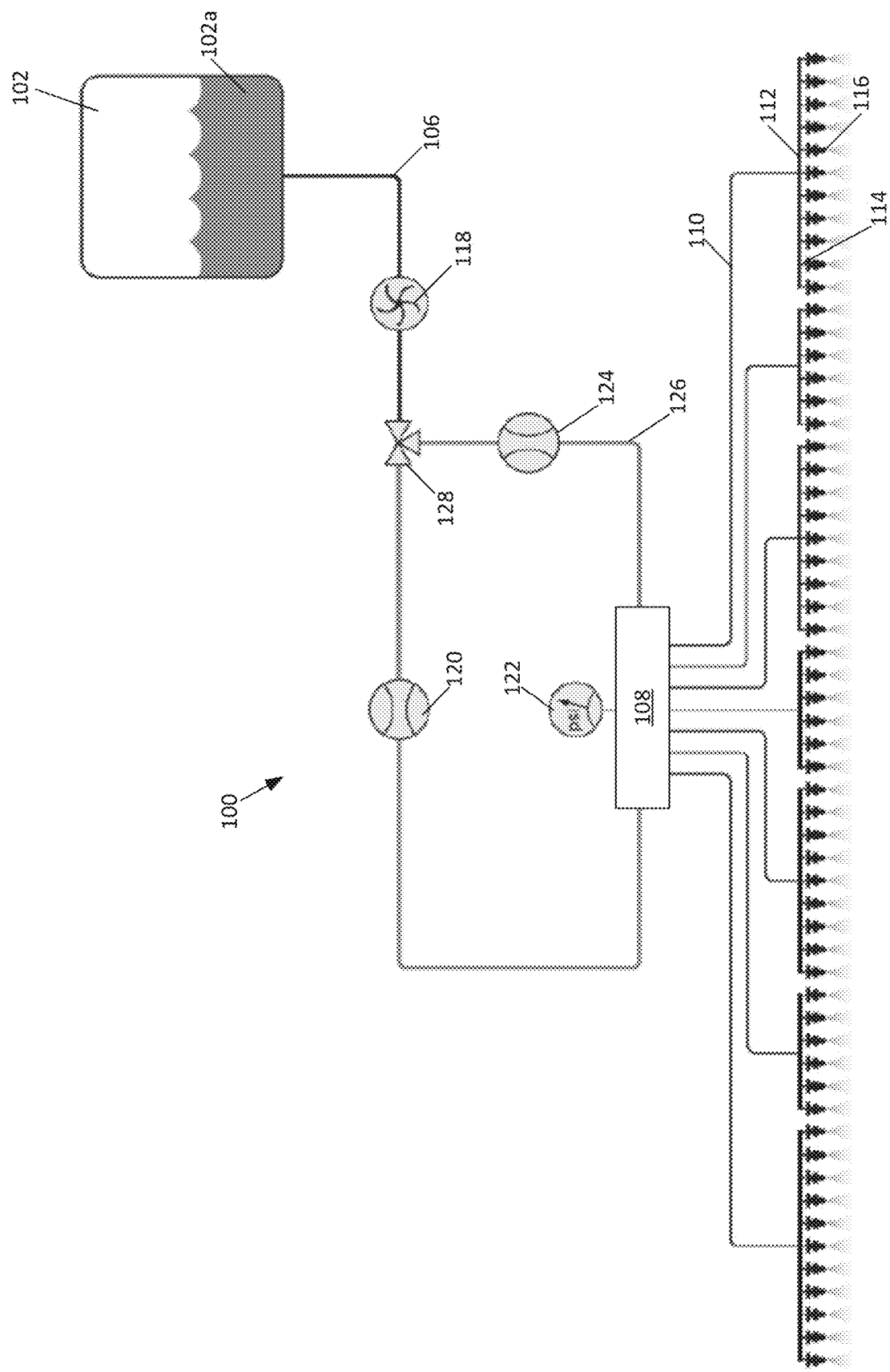
FIG. 3 is a schematic diagram of the spraying system of FIGS. 1 and 2.

Referring to FIG. 3, a schematic of the spraying system 100 is presented. In one aspect, the spraying system 100 draws fluid 102a from a main spray tank 102. Some examples of a fluid 102a stored in the main spray tank 102 are herbicides, pesticides, fertilizers, and other types of treatment fluids.

The spraying system 100 is further shown as including a branch line 106 extending between the main spray tank 102 and a manifold 108 from which a plurality of branch lines 110 extend to manifolds 112 from which another plurality of branch lines 114 extend to individual spray nozzles 116. In the example shown, the nozzles 116 include control valves that can be operated between open and closed positions in an on/off type of control or in a modulating-type (e.g. pwm) control. In the branch line 106, a pump 118 is provided for pumping the fluid 102a from the main spray tank 102 to the nozzles 116. A main flow meter 120 and carrier manifold pressure sensor 122 are also shown for providing inputs to a control system such that the pump 118 can be appropriately operated.

The spraying system 100 is also provided with a nozzle testing system including a nozzle check flow meter 124 located in a branch line 126 that is in fluid communication with the pump 118 and the manifold 108. The testing system is also shown as including a valve assembly 128 for selectively directing flow from the pump 118 to either the main flow meter 120, in a normal operating mode or to the nozzle check flow meter 124, in a nozzle test operating mode. In the example shown, the valve assembly 128 is a three-way valve. However, other types of valve arrangements could be utilized, for example, two two-way valves could be provided. In the example shown, the branch lines 106, 126 connect to the manifold at separate locations. However, the branch lines 106, 126 can be alternatively combined into a common line upstream of the manifold such that the flow meters 120, 124 are essentially arranged in a parallel flow arrangement.

In one aspect, the main flow meter 120 has a nominal volumetric flow testing range that encompasses the total combined volumetric flow rate of the nozzles 116. In some examples, the nominal volumetric flow testing range is greater than 10 gallons per minute. As the nominal volumetric flow testing range of the main flow meter 120 greatly exceeds the flow rate of any one individual nozzle 116, which for example is less than one gallon per minute, the main flow meter 120 is unable to provide a reliable measurement of flow when only one nozzle 116 is in the open position and the remaining nozzles are in the closed position, as would be the case when flow testing an individual nozzle 116. To provide a reliable measurement of flow through an individual nozzle 116, the nozzle check flow meter 124 is provided with a nominal volumetric flow testing range that is less than one gallon per minute.

Control System 500

Figure 4:
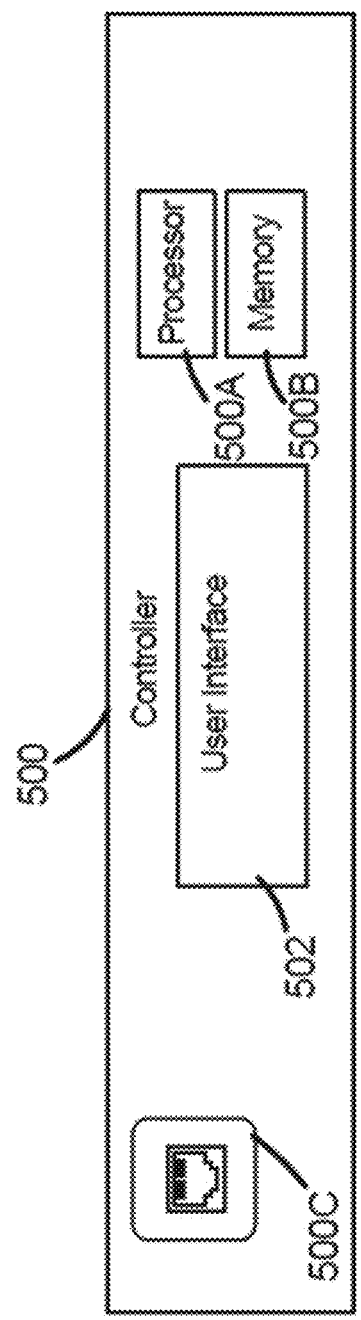
FIG. 4 is a schematic depiction of a control system for operating the spraying system shown in FIG. 3.

Referring to FIG. 4, spraying system 100 may also include an electronic controller 500. The electronic controller 500 is schematically shown as including a processor 500A and a non-transient storage medium or memory 500B, such as RAM, flash drive or a hard drive. Memory 500B is for storing executable code, the operating parameters, and the input from the operator user interface 502 while processor 500A is for executing the code. The electronic controller 500 is also shown as including a transmitting/receiving port 500C, such as an Ethernet port for two-way communication with a WAN/LAN related to an automation system. A user interface 502 may be provided to activate and deactivate the system, allow a user to manipulate certain settings or inputs to the electronic controller 500, and to view information about the system operation.

The electronic controller 500 typically includes at least some form of memory 500B. Examples of memory 500B include computer readable media. Computer readable media includes any available media that can be accessed by the processor 500A. By way of example, computer readable media include computer readable storage media and computer readable communication media.

Computer readable storage media includes volatile and nonvolatile, removable and non-removable media implemented in any device configured to store information such as computer readable instructions, data structures, program modules or other data. Computer readable storage media includes, but is not limited to, random access memory, read only memory, electrically erasable programmable read only memory, flash memory or other memory technology, compact disc read only memory, digital versatile disks or other optical storage, magnetic cassettes, magnetic tape, magnetic disk storage or other magnetic storage devices, or any other medium that can be used to store the desired information and that can be accessed by the processor 500A.

Computer readable communication media typically embodies computer readable instructions, data structures, program modules or other data in a modulated data signal such as a carrier wave or other transport mechanism and includes any information delivery media. The term "modulated data signal" refers to a signal that has one or more of its characteristics set or changed in such a manner as to encode information in the signal. By way of example, computer readable communication media includes wired media such as a wired network or direct-wired connection, and wireless media such as acoustic, radio frequency, infrared, and other wireless media. Combinations of any of the above are also included within the scope of computer readable media.

The electronic controller 500 is also shown as having a number of inputs/outputs that may be used for operating the spraying system 100. For example, the electronic controller 500 is configured to receive inputs from the main flow meter 120, the nozzle check flow meter 124, and the pressure sensor 122. The controller is also configured to send outputs to the nozzles 116, the pump 118, and the control valve assembly 128. The electronic controller 500 can also include additional inputs and outputs for desirable operation of the spraying system 100 and related systems.

System Operation and Testing Method 1000

In a normal operating mode, and with reference to FIG. 3, the control valve assembly 128 is positioned such that fluid 102a from the main spray tank 102 is pumped to the manifold 108 through the main flow meter 120 while being blocked from flowing through the nozzle check flow meter 124. In the nozzle test mode, the control valve assembly 128 is positioned such that fluid 102a from the main spray tank 102 is pumped to the manifold 108 through the nozzle check flow meter 124 while being blocked from flowing through the main flow meter 120. Accordingly, when in the nozzle test mode, all flow generated by the pump 118 and delivered to the manifold 108 and ultimately to an open nozzle 116 is measured by the nozzle check flow meter 124.

With reference to FIG. 5, an exemplary selection and manufacturing process 1000 is presented in which the system is operated in the nozzle test mode. A method of testing individual nozzles on a spray system including a plurality of nozzles in fluid communication with a fluid pump is also disclosed. In a step 1002 of the process 1000, the spray system is switched from the normal operating mode into the nozzle test mode. This step 1002 can occur as a result of the operator in the vehicle cab providing an input through the user interface 502 that running the nozzle test mode is desired. As related previously, placing the spray system in the nozzle test mode includes operating the control valve assembly such that all flow from the pump is directed through the nozzle check flow meter and blocked from flowing through the main flow meter. Either before or after switching modes, the spray system can perform a charging or purge step in which all of the nozzles are opened with the pump running for a predetermined period of time to ensure that all air is purged from the system before taking any further steps. In a step 1004, the pump can be operated to meet a first pressure set point. In some implementations, the manifold pressure sensor used during normal operation can be used for controlling the pump. In other implementations, a dedicated pressure for the nozzle test system can be utilized. In a step 1006, one of the individual nozzles of the spray system is opened while maintaining the remaining nozzles in a closed position while in a step 1008, the resulting flow rate through the nozzle check flow meter is measured, and optionally recorded. The nozzle is then closed at a step 1009. In some examples, each nozzle is opened for a predetermined period of time before being closed. Each nozzle is tested in this manner until the flow rate through each individual nozzle has been measured at the nozzle check flow meter. In a step 1010, the measured nozzle flow rates are compared to a target flow parameter which can be, for example, a minimum flow rate, a maximum flow rate, or a range of flow rates. Step 1010 can be performed after all of the nozzles have been tested and measured or can be performed for a nozzle before the next nozzle is tested. In a step 1012, the system can provide a notification to the operator, for example via the user interface, as to which nozzles passed and/or failed the test. The notification can also include a report of the actual measured flow rate for each nozzle or for a selected set of nozzles, for example for the nozzles that failed the test. Once the test is complete, the system can either automatically exit the nozzle test mode and return to the normal operating mode, or the user can provide a command for doing so.

With the disclosed system and method, the flow performance of each nozzle can be reliably tested without requiring the spray system operator to exit the cab. As such system spray accuracy is improved while allowing the operator to enjoy the comfort, convenience and safety of remaining in the cab. More importantly, the disclosed system and method reduces operator exposure to potentially harmful chemicals by eliminating the need to manually flow check the spray nozzles at the boom.

From the forgoing detailed description, it will be evident that modifications and variations can be made in the aspects of the disclosure without departing from the spirit or scope of the aspects. While the best modes for carrying out the many aspects of the present teachings have been described in detail, those familiar with the art to which these teachings relate will recognize various alternative aspects for practicing the present teachings that are within the scope of the appended claims.

I claim:

1. A method of testing individual nozzles on a spray system including a plurality of nozzles, the method including:

a. providing the spray system including a main spray tank, a pump in fluid communication with the main spray tank, a valve arrangement in fluid communication with the pump, a manifold in fluid communication with the valve arrangement, and the plurality of nozzles in fluid communication with the manifold, wherein the spray system further includes a first fluid passageway having a first piping branch and a main flow meter, and a second fluid passageway having a second piping branch and a nozzle check flow meter extending from the valve arrangement to the manifold, wherein the valve arrangement is operable to direct flow from the main spray tank, the pump, and through one of the first and second fluid passageways while blocking flow through the other of the first and second fluid passageways;

b. configuring the spray system from a normal operating mode into a nozzle test mode by operation of the valve arrangement, wherein the normal operating mode includes directing flow from the main spray tank, through the pump, through the valve arrangement, through the first fluid passageway including the main flow meter, through the manifold, and to the plurality of nozzles, while preventing flow through the second fluid passageway including the nozzle check flow meter, wherein the nozzle test mode includes:

i. directing flow from the main spray tank, through the pump, through the valve arrangement, through the second fluid passageway including the nozzle check flow meter, through the manifold, and to the plurality of nozzles such that all flow from the pump is directed through the nozzle check flow meter while preventing flow through the main flow meter;

ii. operating the pump to meet a first pressure set point;

iii. opening one of the individual nozzles of the spray system while maintaining the remaining nozzles in a closed position;
iv. measuring the resulting flow rate through the nozzle check flow meter;
v. closing the individual nozzle; and
vi. repeating steps ii) to v) until the flow rate through each individual nozzle has been measured at the nozzle check flow meter.

2. The method of claim 1, further comprising:
a. recording each of the measured flow rates through the individual nozzles.

3. The method of claim 1, further comprising:
a. comparing the measured flow rates through each individual nozzle to a target flow parameter.

4. The method of claim 3, further comprising:
a. providing an indication of which individual nozzles fail to meet the target flow parameter.

5. The method of claim 3, wherein the target flow parameter is a flow rate range.

6. The method of claim 4, wherein the target flow parameter is a minimum flow rate.

7. The method of claim 1, further comprising:
a. purging the spray system of air prior to configuring the system to operate in the nozzle test mode.

8. The method of claim 1, wherein the configuring step includes operating a three-way valve to direct flow from the pump to the nozzle check flow meter.

9. The method of claim 1, wherein the step of opening one of the individual nozzles includes opening one of the individual nozzles for a predetermined time period before closing the individual nozzle.

10. The method of claim 3, wherein the comparing step is performed as each individual nozzle is being tested.

11. The method of claim 1, further comprising:
a. configuring the spray system from the nozzle test mode to the normal operating mode once all individual nozzles have been tested.

12. The method of claim 4, wherein the step of providing an indication includes providing a notification at a user interface located within a cab of a vehicle.

13. The method of claim 1, wherein the configuring step is initiated from a user interface located within a cab of a vehicle.

14. The method of claim 4, wherein the step of providing a notification includes reporting the measured flow rates of at least the individual nozzles failing to meet the target flow parameter.

15. The method of claim 1, wherein the step of directing flow from the pump through a main flow meter and preventing flow through a nozzle check flow meter and the step of directing flow from the pump to the nozzle check flow meter while preventing flow through the main flow meter are effectuated by operating a single three-way valve.

* * * * *